(12) United States Patent
Papageorgiou et al.

(10) Patent No.: US 9,196,091 B2
(45) Date of Patent: Nov. 24, 2015

(54) IMAGE PROCESSING METHOD AND SYSTEM

(75) Inventors: Pavlos Papageorgiou, Edinburgh (GB); Richard Moffett, Edinburgh (GB); Judith Underwood, Edinburgh (GB); Andy Smout, Edinburgh (GB)

(73) Assignees: KABUSHIKI KAISHA TOSHIBA, Tokyo (JP); Toshiba Medical Systems Corporation, Otawara-shi (JP)

( * ) Notice: Subject to any disclaimer, the term of this patent is extended or adjusted under 35 U.S.C. 154(b) by 513 days.

(21) Appl. No.: 13/357,039

(22) Filed: Jan. 24, 2012

(65) Prior Publication Data
US 2013/0187903 A1     Jul. 25, 2013

(51) Int. Cl.
*G06T 19/00*       (2011.01)
(52) U.S. Cl.
CPC ........... *G06T 19/00* (2013.01); *G06T 2219/028* (2013.01); *G06T 2219/2004* (2013.01); *G06T 2219/2016* (2013.01)
(58) Field of Classification Search
USPC ........................................................ 345/419
See application file for complete search history.

(56) References Cited

U.S. PATENT DOCUMENTS

| | | | | |
|---|---|---|---|---|
| 6,369,812 | B1* | 4/2002 | Iyriboz et al. ................. | 345/419 |
| 7,061,484 | B2* | 6/2006 | Bailey et al. .................. | 345/419 |
| 2004/0161144 | A1* | 8/2004 | Barth ............................ | 382/154 |
| 2006/0228012 | A1* | 10/2006 | Masuzawa ..................... | 382/131 |
| 2008/0074427 | A1* | 3/2008 | Barth ............................. | 345/502 |
| 2008/0246768 | A1* | 10/2008 | Murray et al. ................. | 345/427 |
| 2009/0304250 | A1* | 12/2009 | McDermott et al. .......... | 382/131 |
| 2010/0177177 | A1* | 7/2010 | Sonnemans et al. ........... | 348/61 |
| 2012/0113111 | A1* | 5/2012 | Shiki et al. .................... | 345/419 |
| 2012/0172700 | A1* | 7/2012 | Krishnan et al. .............. | 600/407 |
| 2013/0121548 | A1* | 5/2013 | Kovalan et al. ................ | 382/128 |
| 2013/0135287 | A1* | 5/2013 | McCabe et al. ............... | 345/419 |

FOREIGN PATENT DOCUMENTS

CN       1903139 A      7/2006

OTHER PUBLICATIONS

Office Action mailed Jun. 18, 2015 in Chinese Application No. 201310026365.7.

* cited by examiner

*Primary Examiner* — Kimbinh T Nguyen
(74) *Attorney, Agent, or Firm* — Oblon, McClelland, Maier & Neustadt, L.L.P.

(57) ABSTRACT

A method of displaying images representative of image data includes providing a user interface for displaying a three-dimensional (3D) image and at least one two-dimensional (2D) image, setting a volumetric field of view for the 3D image, setting a respective further field of view for the at least one 2D image, and linking the volumetric field of view and the at least one further field of view so that a movement of the volumetric field of view of the 3D image automatically causes a corresponding movement of the further field of view of the at least one 2D image, and so that a movement of the further field of view or at least one of the field of view of the at least one 2D image automatically causes a corresponding movement of the volumetric field of view of the 3D image.

32 Claims, 7 Drawing Sheets

Fig.1

PRIOR ART

IMAGE PROCESSING METHOD AND SYSTEM

FIELD

Embodiments described herein relate generally to a method of and system for displaying two-dimensional and three-dimensional images representative of volumetric image data, for example a method of and system for displaying two-dimensional and three-dimensional medical images.

BACKGROUND

Certain medical imaging modalities capture three-dimensional data. Examples of such tomographic imaging modalities include CT, MR, X-ray angiography with three-dimensional reconstruction, PET, SPECT, and other nuclear medicine imaging modalities, and newer forms of ultrasound acquisition. Image data obtained using such modalities can be presented conventionally as a series of two-dimensional images. However, increasingly it is seen as beneficial to store the three-dimensional data in a computer and generate two-dimensional images to extract different information, such as cross sections or projections, interactively under control of a user.

Various different types of images can be obtained from volumetric image data using known techniques, including Multi-Planar Reformat (MPR) images, Maximum Intensity Projection (MIP) images, and volume rendered (VR) images.

MPR images are two-dimensional cross-sectional images computationally extracted from a three-dimensional sampled field. The two-dimensional cross section can be an approximation to an infinitely thin plane. The cross section can also be a finite zone defined by a plane and a distance, where data is accumulated perpendicular to the plane using a maximum, minimum, or average operator. MPR images obtained using a cross section greater than a certain thickness are often referred to as MPR slabs. MPR slabs can be displayed using any suitable rendering technique (for example, intensity projections, volume rendering, intensity projection with colour map)

MIP images are projection images created by accumulating the entire three-dimensional field, or a large region of the three-dimensional field, along a vector. Usually, parallel vectors are used for accumulation and data is accumulated using a maximum, minimum, or average operator.

VR images are projection images obtained by accumulating the whole or a region of the three-dimensional field. Either parallel or divergent vectors are used for accumulation. The operator is chosen as a grossly approximate model of the interaction of coloured light and solid surfaces.

Many other types of two-dimensional or three-dimensional images can also be obtained, and MPR images, MIP images and VR images are mentioned purely by way of example.

In a known medical imaging system, it is known to present simultaneously a set of generated two-dimensional images, each two-dimensional image derived from the same three-dimensional data and/or the same measurement apparatus. For example, it is common to present three MPR images taken at mutually orthogonal planes, a VR image, and/or a MIP image. The user is able to modify geometric parameters of the images such as plane angles or locations, and photometric parameters such as the mapping from high-dynamic-range scalar data to display pixel values. New images are then generated according to the new parameters and the display is refreshed.

There is prior art relating to synchronized operation of groups of MPR images. For example, the display and synchronised manipulation of three mutually orthogonal MPR images is known, and various aspects of the arrangement, movement, or linkage of the MPR views with each other are implemented in known diagnostic imaging equipment.

One known technique is to present three mutually orthogonal MPR views such that the three-dimensional point where they intersect is aligned horizontally on the screen across two views, and vertically on the screen across two other views.

It is also known to present a VR or MIP view alongside the MPR views. However, the VR or MIP view in known systems is not well synchronized with the MPR views. In one common configuration known in the prior art, the VR or MIP view is controlled independently of the MPR views. A known method of controlling the field of view of the VR view is to present a three-dimensional wire frame cuboid superimposed on the VR or MIP view and allow the user to drag edges of the wire frame with a mouse to alter the VR or MIP field of view.

Another common configuration known in the prior art is to make the MPR views show a superset of the field of view of the VR or MIP view and allow the user to control a representation of the field of view of the VR or MIP view on the MPR views. A known way of doing this is to present on each MPR view a two-dimensional wire frame showing the orthogonal projection of the VR or MIP field of view in that MPR view, and to allow the user to drag the edges of the wire frame on the MPR to alter the field of view of the VR or MIP view.

A further technique, which is used by some known products, such as Toshiba's Voxar 3D® is to link the intersection point of the MPR views with the centre of the VR or MIP field of view. In this configuration the VR or MIP field of view may be constrained to be a cube. The user is able to move the intersection point of the MPR views by dragging cross hairs on the MPR views, by scrolling, or by other means. The VR or MIP field of view follows that movement as it is constrained to being always centred on the MPR intersection point.

Known techniques for displaying simultaneously three-dimensional images and two-dimensional images obtained from the same volumetric data set have various disadvantages.

For example, in the case of a system in which the user has to manipulate the VR or MIP view independently from the MPR views, the manual operations required of the user in order to view the same anatomical regions or features in MPR views and in a VR or MIP view can be tedious and time consuming. If the user wishes to continue to view the same anatomical regions or features as they navigate the images it is necessary for the user to continually manipulate the MPR views and the VR or MIP views and they have to manually ensure that fields of view of the different images overlap sufficiently.

In a system where the three-dimensional field of view of the VR or MIP views is controlled by a two-dimensional wire frame on the MPR views, it is difficult for a user to appreciate the anatomy of a subject in the MPR views or to make good use of screen space, as the MPR views have to have a wide field of view in order that the representation of the VR and MIP field of view can be freely positioned inside it. Furthermore, the method of controlling the field of view of the VR and MIP views in such a system is different from the method of controlling the field of view of MPR images (if such a method of controlling the field of view of the MPR is provided), which can make operation by a user complicated and time consuming.

Known systems in which the centre of the field of view of VR and MIP views is linked to the intersection point of the MPR allow the user to continually see the same anatomy in MPR and VR or MIP, at least over a small area, and it allows user control of the field of view on any of the MPR, VR, or MIP views. However such systems fail to make good use of screen space and sometimes fail to present the images according to standard conventions. For example it is common for such systems to display an MPR, VR or MIP field of view that is smaller than the available view and positioned off-centre, so that large portions of a view are unproductively blank.

BRIEF DESCRIPTION OF THE DRAWINGS

Embodiments are now described, by way of non-limiting example, and are illustrated in the following figures, in which.

DETAILED DESCRIPTION

According to one embodiment there is provided a method of displaying images representative of volumetric image data comprising providing a user interface for displaying a three-dimensional image and at least one two-dimensional image based upon a volumetric data set, setting a volumetric field of view for the three-dimensional image, setting a respective further field of view for the or each of the at least one two-dimensional images, linking the volumetric field of view and the at least one further field of view so that a movement of the volumetric field of view of the three-dimensional image automatically causes a corresponding movement of the further field of view or at least one of the further fields of view of the at least one two dimensional image, and so that a movement of the further field of view or at least one of the further fields of view of the at least one two dimensional image automatically causes a corresponding movement of the volumetric field of view of the three dimensional image.

Figure 1:
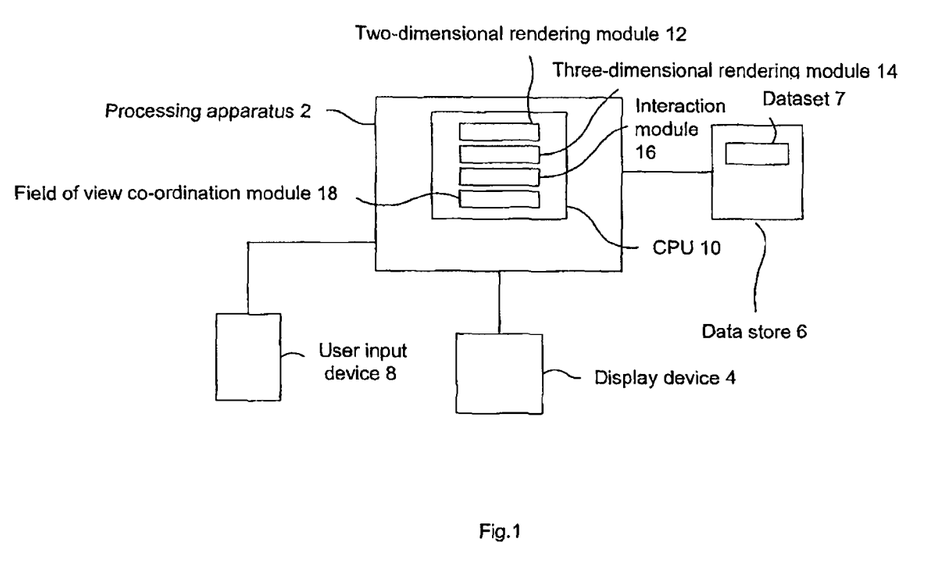
FIG. 1 is a schematic illustration of an image processing system according to an embodiment.

An image processing apparatus according to an embodiment is illustrated schematically in FIG. 1 and is configured to implement the method described in the preceding paragraph. The apparatus comprises a processing apparatus 2, in this case a personal computer (PC) or workstation that is connected to a display device 4, a data store 6 and a user input device or devices 8, in this case a computer keyboard and mouse.

The processing apparatus 2 comprises a central processing unit (CPU) 10 that is operable to load and execute a variety of software modules or other software components. In the embodiment of FIG. 1, the software modules include a two-dimensional rendering module 12, a three-dimensional rendering module 14, a user interaction module 16 and an Image field-of-view co-ordination module 18.

The processing apparatus 2 includes other standard components of a PC including RAM, ROM, a data bus, an operating system including various device drivers, and hardware devices (for example a graphics card) for interfacing with various peripheral devices. Such standard components are not shown in FIG. 1 for clarity.

In operation, the processing apparatus 2 is operable to download volumetric medical image data, for example CT, MR, X-ray angiography, or ultrasound image data, from the data store 6, to render and display that image data as two-dimensional or three-dimensional images, and to allow a user to perform various operations on the images.

The processing apparatus can be configured to perform desired image operations and can, for example, be configured to perform known methods for displaying the medical image data if so desired. Some brief description of one such known method is provided before methods according to embodiments are described.

Figure 2:
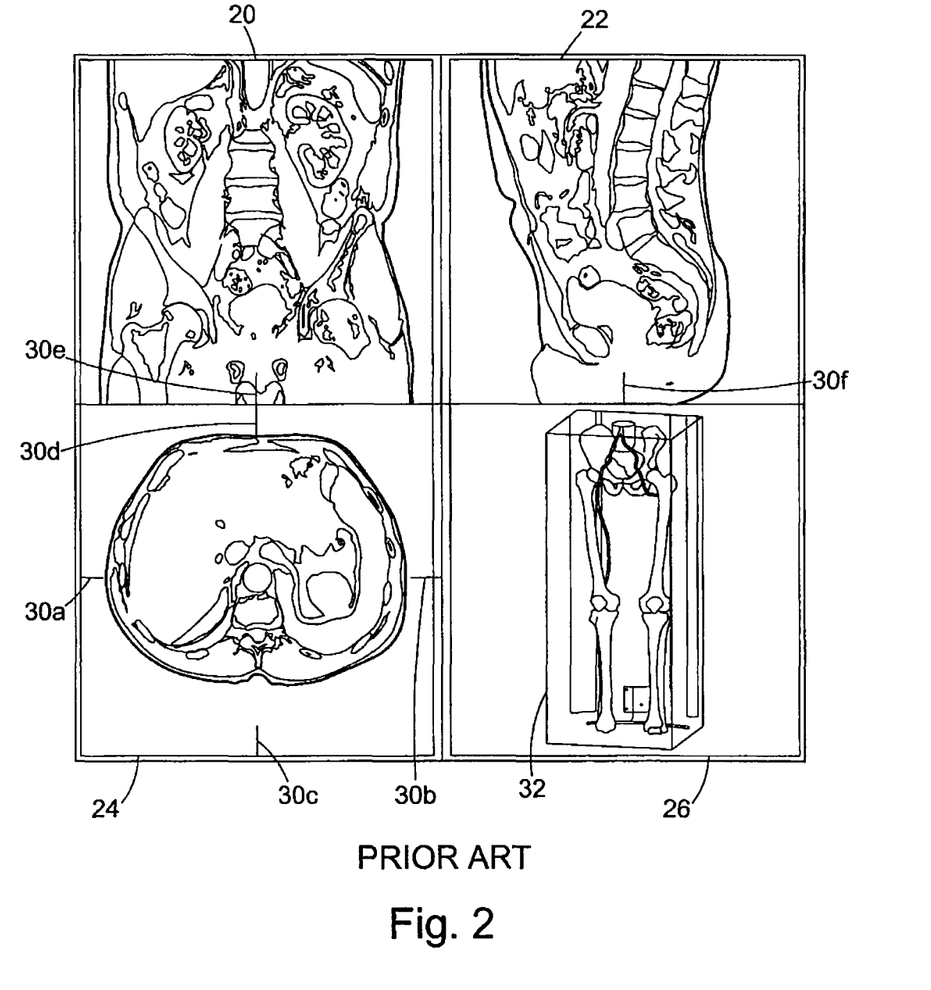
FIG. 2 is a screenshot of two-dimensional and three-dimensional images displayed according to known techniques.

FIG. 2 shows a selected portion of the volumetric image data displayed in accordance with known techniques. In this case, four display windows 20, 22, 24, 26 are displayed on the screen of the display device 4.

One of the display windows 20 shows a two-dimensional MPR view of a selected portion of anatomy of a patient or other subject in the coronal plane, another of the display windows 22 shows a two-dimensional MPR view of the selected portion of anatomy in the sagittal plane, and a third of the display windows 24 shows a two-dimensional MPR view of the selected portion of anatomy in the transverse or horizontal plane. Thus, the display windows 20, 22, 24 show views of the portion of the anatomy in three mutually orthogonal slices through the volume represented by the volumetric dataset. The point at which the three mutually orthogonal slices meet is referred to as the intersection point.

In the known example of FIG. 2, the position of the intersection point is indicated by crosshairs 30a, 30b, 30c, 30d, 30e, 30f displayed on the display windows 20, 22, 24. For each display window, the position of the intersection point corresponds to the position at which lines drawn between pairs of crosshairs would intersect. So for example in display window 24, the intersection point is at the point where a straight line drawn between 30a and 30b would intersect a straight line drawn between 30c and 30d.

The fourth window 26 provides a three-dimensional, volume rendered view of the patient's anatomy. The volumetric data displayed in three dimensions in the fourth window 26 is selected as being that data falls within a volume defined by the wire frame box 32.

In operation, a user can vary the position of the intersection point by sliding one of the crosshairs 30a, 30b, 30c, 30d along the side or top of a display window 20, 22, 24 using a select and drag operation performed with a mouse. The intersection point is not limited to being positioned in the centre of a display window 20, 22, 24.

A user can also perform a scroll or pan operation on any one of the two-dimensional images displayed in the display windows 20, 22, 24. Usually, a pan operation is performed by positioning a mouse pointer anywhere in the display window 20, 22, 24 and then performing a select and drag operation using a mouse.

A user can also drag the wire frame lines of box 32 using the mouse to change the field of view of the three dimensional image. Such alteration of the three dimensional image is performed independently of any alteration of the two dimensional images.

It is time-consuming for the user to control the two dimensional views and the three dimensional view to show the same anatomical areas and then to maintain them in a relationship so that they continue showing the same anatomical areas despite panning or other image operations. The tools for manipulating the fields of view of the two dimensional views and the three dimensional view are different, and they need to be used alternately, with some skill, to keep the views in synchronisation.

Figure 3:
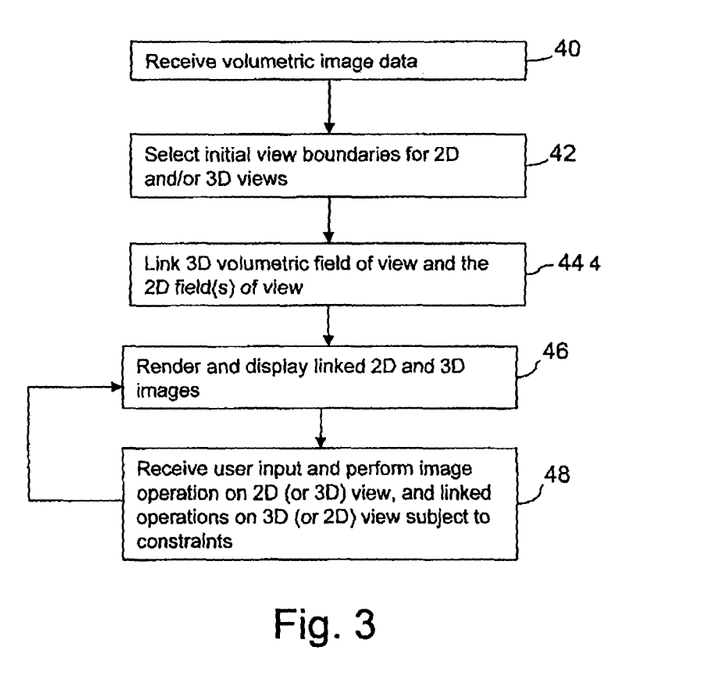
FIG. 3 is a flowchart illustrating a method performed by the system of FIG. 1 according to an embodiment.

A method of operation in accordance with an embodiment is now described, with reference to the flowchart of FIG. 3.

At the first stage of the process 40, the processing apparatus 2 receives a volumetric image dataset 7 from the data store 6. In this case the volumetric image data set comprises three-dimensional CT image data representative of a patient's anatomy, but any suitable volumetric image data can be used.

The image field-of-view co-ordination module 18 sets initial fields of view for desired two-dimensional and three-dimensional views of the volumetric image data. In this case, the processing apparatus is configured to display the three mutually orthogonal two-dimensional MPR views and a VR or MIP view, but any combination of two-dimensional or three-dimensional views may be used in alternative embodiments.

In one mode of operation of the embodiment, the initial views are set to display all volumetric image data in the dataset. In variants of the embodiment, the initial views are set according to various constraints.

For example, the initial orientations of MPR planes can be set to display transverse, coronal, and sagittal views of the anatomy. The initial orientation of the VR or MIP views is set upright and viewed directly from anterior. In one variant, the initial MPR views are set to make transverse views fit to the display window.

In the case of CT data, the intersection point can be set initially to be in the centre of the first or last acquired slice. Usually that means that the intersection point is on the medial axis of the patient. For some scans the intersection point is at the centre of the most superior slice and for other scans it is at the centre of the most inferior acquired slice.

The view point may be set at a position closest to the scan centre that results in displaying the intersection point in the two-dimensional MPR images and keeping the intersection point within the field of view of the three-dimensional VR or MIP image.

It is a feature of the described embodiment that the field of view of the three-dimensional image and the field of view of the two-dimensional images are linked, such that a change in the position of one of the fields of view (for example, movement in the plane of the display) automatically causes a corresponding change in the field of view of at least one other of the images and vice versa, subject to any constraints. In the embodiment of FIG. 1, the linking is implemented by way of linking of a view point for each of the images, with the field of view being set with reference to the view point (for example the view point being defined as being at the centre of the field of view) so that as the view point moves the field of view also moves. Any other suitable method of linking the fields of view can be used in alternative embodiments.

Figure 4:
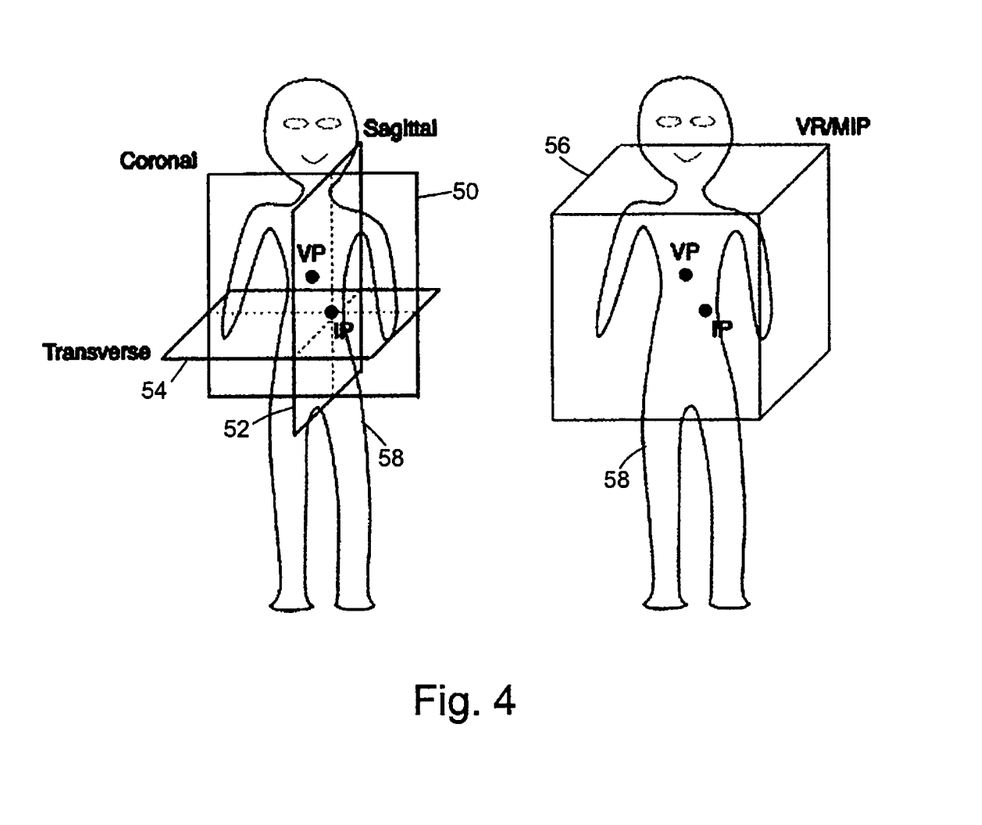
FIG. 4 is a schematic illustration showing two-dimensional and three-dimensional fields of view, and their relation to view points and intersection points in one mode of operation.

The position of the view point can be understood with reference to FIG. 4, which shows schematically the position of the view point (VP) and the intersection point (IP) with reference to the two-dimensional coronal 50, sagittal 52 and transverse 54 MPR planes and a field of view of the three-dimensional VR or MIP view 56.

The view point and the intersection point are variable points defined in the three dimensional space that includes the subject's anatomy 58.

The intersection point is the point that is in common to all three mutually orthogonal MPR planes 50, 52, 54. In the case that some MPR views are projections of a finite zone (slab), the plane at the centre of the zone is used for this definition. The user can control the position of the intersection point.

The view point is another point, which can be set by the user. For example, the view point can be a point that is selected by the user and may be a point around which the user is interested in viewing a subject's anatomy.

In the described mode of operation the view point for the three-dimensional image and for each of the two-dimensional images is the same. In alternative embodiments or modes of operation, the view point for the three-dimensional image and for one or more of the two-dimensional images can be linked but different. In general, it has been found that setting the view point to be the same for the three-dimensional image and the two-dimensional images is useful as the same anatomical areas are then automatically seen in all images, but that can be varied if desired by a user.

The field of view of each two-dimensional MPR view delimits the area that is viewed in the MPR view. Similarly the volumetric field of view delimits the volume that is viewed in the three-dimensional MIP or VR view.

The Image field-of-view co-ordination module 18 selects the field of view 56 for the three-dimensional VR or MIP image. In one mode of operation, the (X,Y) dimensions of the viewing window where the VR or MIP view is to be displayed, where X is width and Y is height, are extended to form the (aX, aX, aY) dimensions of a clipping cuboid 56 where aX is the extent in the patient's left-right direction, aX is also the extent in the patient's anterior-posterior direction, and aY is the extent in the patient's superior-inferior direction. The magnification factor, a, relates real space dimensions to pixel counts on the display screen.

In some embodiments, a margin is included between one or both of the edges of the viewing window and the edge of the two-dimensional or three-dimensional image. Similarly, the three-dimensional VR or MIP view can be clipped by a front and/or rear clipping plane in the third orthogonal direction (for example, parallel to the plane of the display screen) such that, for example, the depth of the volumetric field of view in that direction is aX-c or aY-c, where is a clipping distance. The use of margins and clipping planes can ensure that the whole of the three-dimensional image remains visible in the three-dimensional view window despite any rotation of the image within the window.

Once the initial conditions have been set, the two-dimensional rendering module 12 and the three-dimensional rendering module 14 display each of the two-dimensional images and the three-dimensional image in a respective display window in accordance with the initial conditions.

Figure 5:
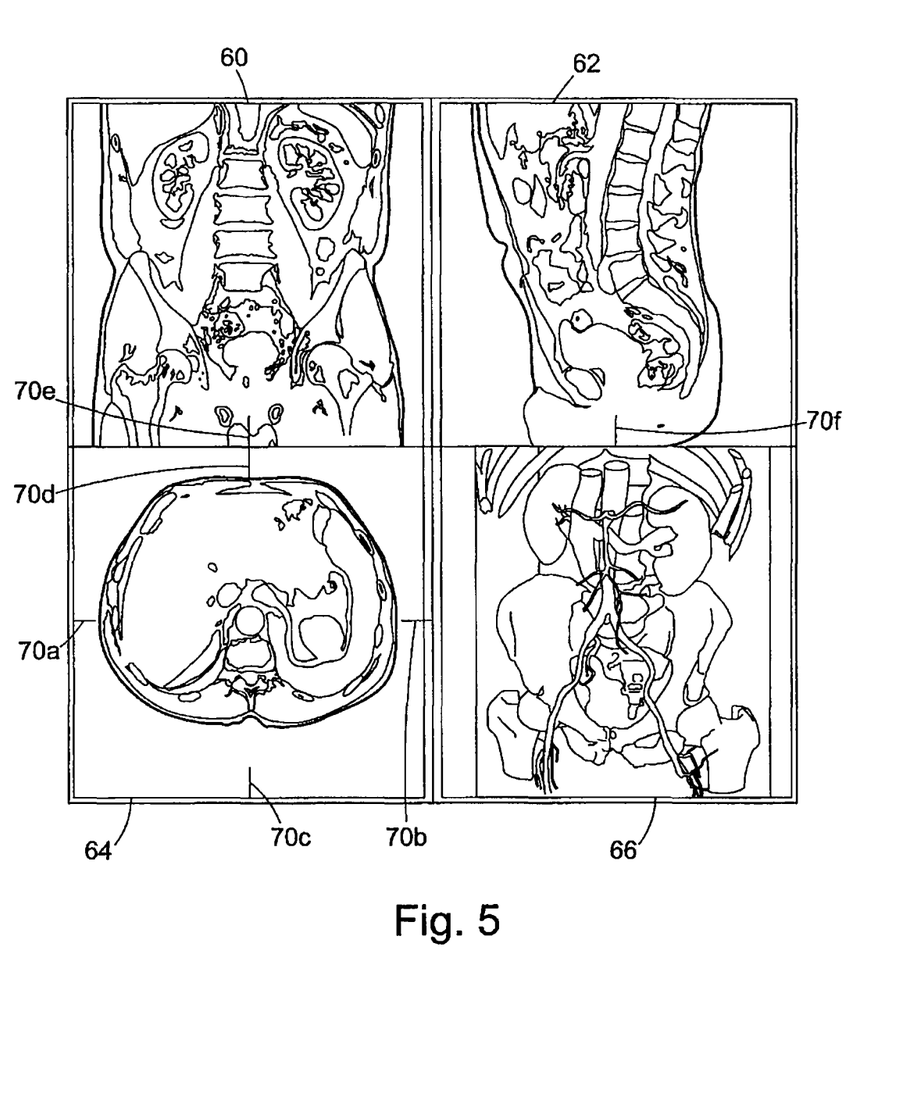
FIG. 5 is a screenshot of two-dimensional and three-dimensional images displayed according to the method of FIG. 3.

FIG. 5 shows the display of the three orthogonal two-dimensional MPR views in display windows 60, 62, 64 and the display of a three-dimensional VR image in display window 66 in accordance with the described mode of operation of the embodiment.

The position of the intersection point is indicated by the pairs of crosshairs 70a, 70b, 70c, 70d, 70e, 70f displayed on the display windows 60, 62, 64.

At the next stage 48 of the process, the user interaction module 16 receives user input from the user input device 8, and performs image operations in response to the user input. The user input may comprise any type of mouse operation performed with respect to the displayed images, a keyboard operation, or any other suitable type of user input.

It is a feature of the described embodiment that a user operation in respect of any of the two-dimensional images that causes a change in the view point of those two-dimensional images, automatically causes a change in the field of view of the three-dimensional image and displayed in the window 66, subject to constraints. Similarly, a change in the view point and thus the field of view of the three-dimensional image automatically causes a change in the view point, and thus the field of view of one or more of the two-dimensional images, subject to any constraints.

The user can change the field of view of both the MPR and the VR views, in synchrony, by selecting a pan tool icon with the mouse and dragging over any one of the views. The input is interpreted in a similar way for all windows, and the views maintain the same field of view at all times.

Considering an example of a pan operation in more detail, a user selects a pan tool icon and then places the mouse pointer within the two-dimensional image display window 60, presses the mouse button and then performs a drag operation to drag the image displayed in the window downwards. Thus, the image displayed in window 60 changes to show anatomy of the subject at higher regions of the torso. That dragging of the image automatically causes a corresponding change in the field of view of the three-dimensional image displayed in the window 66. Thus, as the two-dimensional image in window 60 is panned downwards (or upwards, or sideways), for example by movement of a user's mouse, a corresponding panning of the three-dimensional image displayed in window 66 is performed automatically, such that the two-dimensional and three-dimensional images automatically represent the same anatomical regions.

The user can also perform a similar pan operation on the three-dimensional image displayed in window 66, by operation of the mouse. In this case, the user places the mouse within the three-dimensional image display window 66, presses the mouse button and then performs a drag operation to drag the image displayed in the window downwards. Thus, the image displayed in window 66 changes to show anatomy of the subject at higher regions of the torso. The dragging of the image, by definition, causes a change in the field of view of the three-dimensional image displayed in window 66. In turn, that causes a corresponding panning of one or more of the two-dimensional images. Thus, as the three-dimensional image displayed in window 66 is dragged downwards (or upwards or sideways), for example by movement of the user's mouse, a corresponding panning of one or more of the two-dimensional images in windows 60, 62, 64 is performed automatically.

In another operation, a user can set the position of the view point via entry of position coordinates, for example via the keyboard. The two-dimensional and three-dimensional views are then set automatically based on that selected position.

In the described embodiment there are certain image operations that the user can perform on the three-dimensional image (or the two-dimensional images) that do not necessarily cause a corresponding change to the two-dimensional images (or the three-dimensional image).

For example, a user can perform a rotate operation on the three-dimensional image without causing a corresponding change in the two-dimensional images. That allows the user to manipulate the three-dimensional view whilst maintaining a two dimensional view fixed, which can provide for simple and intuitive manipulation of images on the part of the user without losing track, or having to relocate subsequently, the two dimensional images.

In the embodiment of FIG. 1, the rotation of the VR or MIP view is based on two degrees of freedom. One degree of freedom, mapped to mouse left-right motion, allows continuous 360 degree rotation around the patient's superior-inferior axis. The second degree of freedom, mapped to mouse up-down motion, allows 360 degree or 180 degree rotation of the imaginary camera around the centre of the acquisition, from looking at the patient's head, through the horizontal plane, to looking at the patient's foot. A projection of the patient's superior-inferior axis is constrained to be vertical on the screen.

Additionally, an alternative choice of rotation axes can be provided to improve viewing of head and foot scans. For these scans, one degree of freedom is an up to 360 degree rotation around the patient's left-right axis and the other degree of freedom is an up to 360 degree rotation around the patient's anterior-posterior axis. Any other suitable method of rotating the images can be provided.

The described embodiment provides for manipulation of the two-dimensional and three-dimensional images in a coordinated way using a mouse and keyboard. The embodiment enables the viewing of the same anatomical feature in MPR images and VR or MIP images and the maintenance of a relationship between the images such that if one image is adjusted to show a feature the other image also adjusts to show the same feature.

Thus, a user can continue to see the same anatomical areas in all views as they navigate the MPR and VR or MIP views through the anatomy. That is desirable as different views inform the user about different aspects of the anatomy.

The user is able to navigate the combination of the MPR, VR, and/or MIP views using mouse input or other input directed at any of the views. The user may at times deliver input to the MPR views and at other times deliver (possibly different) input to the VR or MIP view, and the combination of views moves congruently in either case.

The user interaction for moving the field of view of MPR, VR, or MIP views through the anatomy provided by the embodiment is natural and, generally, uniform whichever view is being manipulated. For example, movement of the field of view towards the patient's head is achieved by a top to bottom mouse drag in any view where the cross sectional or projected image has a strong vertical component. In general no image manipulation operations in the described embodiment require a different type of manipulation technique, such as dragging a box, in one of the views compared to the type of image manipulation operations in any other of the views. Thus, a natural and intuitive user interface can be provided.

It is a feature of the described embodiment that the manipulation of images by the user is subject to certain constraints, which can improve the viewing and interaction experience for the user.

The constraints are defined and ordered in a priority system in the described embodiment. The priority system of constraints can be represented by an algorithm for calculating the view point and other parameters of each view. Certain of the constraints require the determination of the position of blank or background areas of each image, which can be performed automatically by the module 18 using known image analysis or filtering techniques. The constraints for the described embodiment are as follows, from lowest priority to highest:

The view point responds to user input.
The view point is not allowed to move outside the three dimensional volume represented by the volumetric data set.

Each MPR view is presented such that the projection of the view point onto the MPR plane projects to the centre of the window where the view is displayed.

If an MPR view is positioned such that there is a blank space on one side of the view, while data extends all the way to the other side of the view, the blank space is restricted to a small margin.

If an MPR view has a horizontal or vertical extent shorter than the available window width or height, it is centred so that any blank space is substantially equally distributed on the left and right margins of the window, and the top and bottom margins of the window.

If a VR or MIP view is presented that has blank space at one end or side of the view, while the field of view extends past the other end or side of the view, the blank space is restricted to a small margin.

If a VR or MIP view has a horizontal or vertical extent shorter than the available window width or height, it is centred so that any blank space is substantially equally distributed on the left and right margins of the window, and the top and bottom margins of the window.

VR and MIP views are presented so that the field of view contains the intersection point. If a user-directed movement of the intersection point would cause it to fall outside the VR or MIP field of view, the view point is automatically moved so that (given the other constraints) the intersection point remains inside the VR or MIP field of view. If a user-directed movement of the view point would cause the intersection point to fall outside the VR or MIP field of view, the intersection point is automatically moved to remain inside the VR or MIP field of view. The automatic movement of the intersection point or view point can be by a minimal amount to satisfy the constraint, can be by a predetermined step size, or can be to one of an array of pre-determined positions, depending on the system configuration. The same constraint can be applied to MPR views.

If the VR or MIP field of view would extend outside the volume represented by the volumetric data set in any direction, the VR or MIP field of view is moved towards the centre of the volume by an amount sufficient to ensure that it does not extend outside the volume, if possible.

MPR views are presented so that the intersection point is always visible. If a user-directed movement of the intersection point would cause it to fall off the visible area of one of the views, the view point is moved so that (given the other constraints) the intersection point remains visible. If a user-directed movement of the view point would cause the intersection point to fall off the visible area of a view, the intersection point is moved to remain visible.

The intersection point responds to user input.

The intersection point is not allowed to move outside the volume represented by the volumetric data set and/or the intersection point is not allowed to move to a point such that an MPR image is blank The intersection point and the view point are shared amongst all participating views.

The image field-of-view coordination module 18 applies the constraints in the order listed, which represents an order of priority. If one of the constraints conflicts with another of the constraints, the module 18 applies the constraint which has the highest priority, and either ignores the other constraint or applies the other constraint only to the extent that is consistent with the other, conflicting, higher priority constraint.

The presentation of the MPR and VR or MIP views in accordance with the constraints can ensure that the images follow conventions such as keeping anatomy upright, viewed as if facing the patient, and making the best use of available screen space. The constraints can help to ensure that efficient use is made of the time of an expert human user, which can often represent the most expensive part of the system. An image that has redundant degrees of freedom, such as one with the patient's head-foot axis upside down or one that is off-centre leaving a large blank space in the view, either distract the user or require mouse movements to adjust to a better presentation. The constraints help to ensure that the most useful views are provided to the user, whilst minimising the input required from the user.

In alternative embodiments or modes of operation, any one or more of the constraints can be included or omitted, and the order of the constraints can be different, if so desired. Other, different constraints can be applied.

For example, in alternative embodiments the constraints that ensure that MIP. VR or MPR fields of view do not extend beyond the acquisition volume are replaced by an alternative constraint that specifies that, for each image, the boundary of the volume represented by the data set cannot be moved beyond a predetermined location in the view window, for example beyond the centre of the window. According to that constraint, blank space can appear in the view window but the image cannot be moved entirely out of the window. That less limiting constraint can be useful in enabling an operator to position a part of an image representing a particular anatomical feature of interest at the operator's eye level. In some circumstances, particularly if the operator is using a large display, that can be more useful than ensuring that there is no blank space on the window.

In the case of FIG. 5, the display windows 60, 62, 64, 66 and the field of view of the MPR views are all of the same size. In alternative embodiments or modes of operation the display windows and fields of view may be of different sizes. In the embodiment of FIG. 1, the user can set the size of the display windows and fields of view to be different if so desired.

In the case where the field of view of different, simultaneously displayed MPR views is not the same, for example where a coronal view and a sagittal view are presented in windows of different height, different configurations of the linked movement of the view point and intersection point may be provided according to different embodiments or modes of operation. Similarly, in cases where the field of view of the VR or MIP view is not congruent with the MPR views because of different window sizes, different configurations of the linked movement of the view point and intersection point may be provided according to different embodiments or modes of operation.

Figure 6:
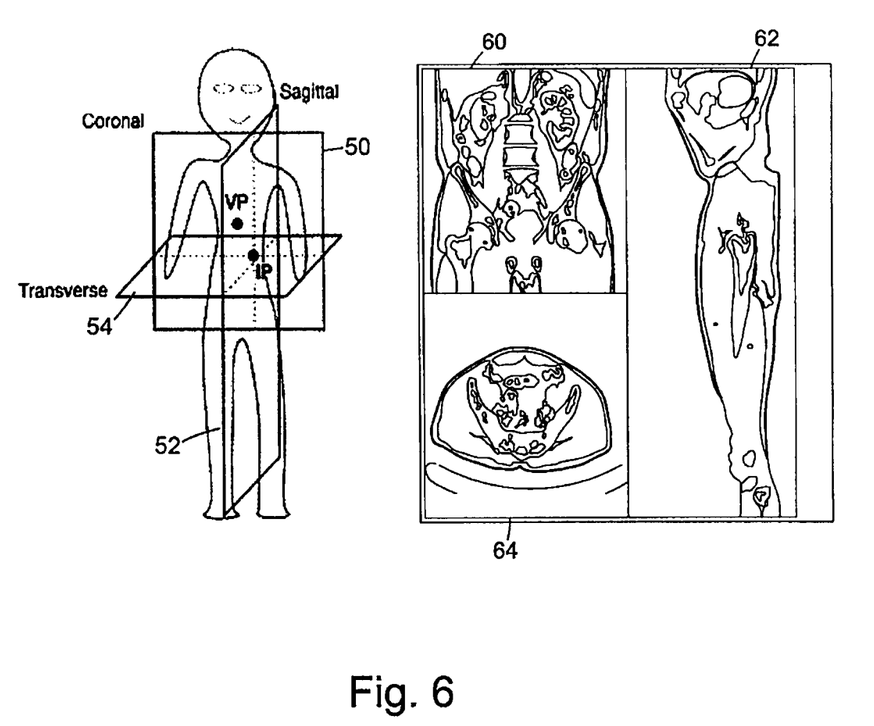
FIG. 6 is a screenshot of two-dimensional and three-dimensional images in a further mode of operation, together with a schematic illustration of the position of two-dimensional fields of view.

An example of the display of MPR windows of different sizes according to an embodiment is now described with reference to FIG. 6. In this case, the two-dimensional view display windows 60, 62, 64 are shown, together with a schematic illustration of the position and size of the coronal 50, sagittal 52 and transverse 54 view boundaries. The three-dimensional view display window 66 is not shown for reasons of clarity, but it will be understood that the three-dimensional view display window 66 can be displayed alongside the display windows 60, 62, 64. In this case the display windows 60, 64 displaying the coronal and transverse MPR views have dimensions of 512 pixels by 512 pixels. The display window displaying the sagittal MPR has been resized (for example on command of the user) and has dimensions of 512 pixels by 1024 pixels. In this case, for simplicity, it is assumed that the volumetric dataset is an array of 512 pixels by 512 pixels by 1024 pixels, representing slices of data, that magnification is 1.0, and that a desired margin provided around views within the windows 60, 62, 64 is zero.

The positions of the view point and the intersection point are well-defined in this example, but there are some open choices about the initial value of these points, and the way they move in response to input, which result in different operation. Different choices may be implemented in different embodiments or different modes of operation.

For instance, suppose the initial intersection point is placed at the centre of the most superior slice, numbered slice 0. The view point could be placed at the centre of slice 255, causing the coronal view to display the most superior half of the scan, or the initial view point could be placed at the centre of slice 511, causing the coronal view to display the central part of the scan.

If the user subsequently attempts to move the view point by performing a pan operation on the coronal view, the view point may be limited to move only between limit slices 255 and 767. The view point cannot move beyond those limits in this case, due to the constraint that the field of view is limited to the volume represented by the volumetric data set. These movements allow the coronal view to display all of the scan, 512 slices at a time. The movements do not change the sagittal view at all, since it is constrained by centring to display the whole of the scan at all times. If the user attempts to move the view point by executing a pan operation on the sagittal view, there are several possible interpretations of this action:
- the view point should not move, and thus no view will change, because the change would not be visible on the sagittal view; or
- the view point should move by the same amount irrespective of which view the input is directed at. This makes it hard to formulate constraints other than keeping the view point in the volume. That in turn may result in unintuitive operation in which the user attempts to perform a panning operation and no view changes, because the view point moves but all views are constrained by centring; or
- if movement of the view point would result in no change of the view receiving the input because of constraints, the view point is first changed to be just inside the centring constraints of the view that received the input, and then the view point is moved. In this example that would cause the view point to jump to the centre of slice 511.

In the embodiment of FIG. 1, the first choice is made with respect to initial conditions, and thus the view point is placed at the centre of slice 255, causing the coronal view to display the most superior half of the scan initially. The third choice is made with respect to movement of the view point in the embodiment of FIG. 1, such that if the user attempts to move the view point by executing a pan operation on the sagittal view, if movement of the view point would result in no change of the sagittal view because of constraints the view point is first changed to be just inside the centring constraints of the sagittal view, and then the view point is moved. In alternative embodiments or modes of operation different choices can be made with regard to those constraints.

In a further mode of operation, the system of FIG. 1 is used to view images derived from two different volumetric datasets simultaneously. A further volumetric dataset, usually representative of the same subject, is obtained. The further volumetric dataset may be obtained at a different time to the original volumetric dataset, and/or may be obtained using a different imaging modality.

The volumetric dataset and the further volumetric dataset are subject to a registration process using the processing resource 10. Any suitable registration process can be used. The registration process results in the volumetric dataset and the further volumetric dataset being mapped to the same co-ordinate system.

The system is configured to display images derived from both the volumetric dataset and the further volumetric dataset simultaneously, for example aligned side-by-side. Any desired combination of images can be displayed. For example, three-dimensional images from both of the volumetric datasets can be displayed simultaneously with two-dimensional images from both of the volumetric datasets.

A view point is defined for each of the images, from both volumetric datasets, and the view points for each of the images are linked as already described. Thus, automatic synchronisation of views obtained from the different volumetric datasets can be obtained. For example, a panning operation performed on one of the images will automatically cause a corresponding pan operation to be performed on at least one of the other images, regardless of whether the other images are obtained from the volumetric dataset or the further volumetric dataset.

In some cases, the volume represented by the volumetric dataset and the further volume represented by the further volumetric dataset will not be identical. For example the volume and further volume may overlap but may have different boundaries. In such cases, the system of constraints can be varied in a manner desired by the user.

For example, the constraint that in use the VR (or MIP) field of view cannot extend outside the volume represented by the volumetric dataset may be extended such that the VR (or MIP) field of view for either of the VR (or MIP) images is constrained so that it can extend outside either of the volumes represented by the volumetric dataset and the further volumetric dataset but stay within the geometric union of the volume represented by the volumetric data set and the volume represented by the further volumetric data set. Alternatively, that constraint could be applied to each VR (or MIP) field of view separately. In that case, the view point for the two VR (or MIP) images may become different when viewing volumes close to the edge of the volumes represented by the volumetric datasets. The constraints can be set, for example based on user preference, to ensure the most natural and intuitive viewing arrangement.

Embodiments described herein have included the feature of linking of a volumetric field of view and the field of view of at least one two-dimensional image, so that movement of one of the images automatically causes corresponding movement of at least one other of the images. In alternative embodiments, a plurality of linked view points may be defined and further constraints may be applied, for example in some embodiments there may be a constraint that each of the plurality of view points must be within a field of view of each of the images and/or each field of view may be defined with respect to the plurality of view points.

Embodiments described herein have been described in relation to the viewing of MPR images and VR or MIP images. However, embodiments are not limited to the viewing of such images. Instead, any suitable two-dimensional and three-dimensional images can be viewed in alternative embodiments. References to MPR images in the preceding description can be replaced by references to any other suitable two dimensional image type, and references to VR or MIP images can be replaced with references to any other suitable three dimensional image type, in describing alternative embodiments.

Any suitable data sets can be used in embodiments. For example, volume data reconstructed from raw data from scanner detectors before a set of cross-sectional images are created can be used, volume data reconstructed from sets of cross-sectional images sent from a scanner to an archive or workstation can be used, or volume data resulting from further processing can be used, for example parametric map data (e.g. 3D time to peek, 3D mean transit time), subtracted volume data and virtual non-contrast volume data. The two dimensional images can be obtained from suitable processing of volumetric data or can be obtained from two dimensional data sets, for example two dimensional data sets obtained directly from a scanner.

The invention is not limited to the display of a single three-dimensional image. In some embodiments, more than one three-dimensional image is displayed and the fields of view of each of the three-dimensional images are linked so that a change in the field of view of one of the three-dimensional images automatically causes a change in the field(s) of view of the other three-dimensional image(s) and vice versa. The different three dimensional images may be obtained from different data sets, for example data sets obtained on the same subject at different times or using different modalities. Alternatively or additionally, the different three dimensional images may comprise different representations, for example obtained using different types of renderer, different render settings, using additional or different clipping or segmentation.

For instance in one medical imaging embodiment, a three dimensional volume rendered (VR) view and a three dimensional MIP view may be displayed side-by-side having the same volumetric field of view. Such an embodiment can be particularly useful as MIP views usually show contrast enhanced vessels more accurately than VR views, but depth may be harder to appreciate in MIP views. In another embodiment, the same volume may be displayed in different three dimensional views having the same volumetric field of view and presentation settings but which are views from different directions.

Figure 7:
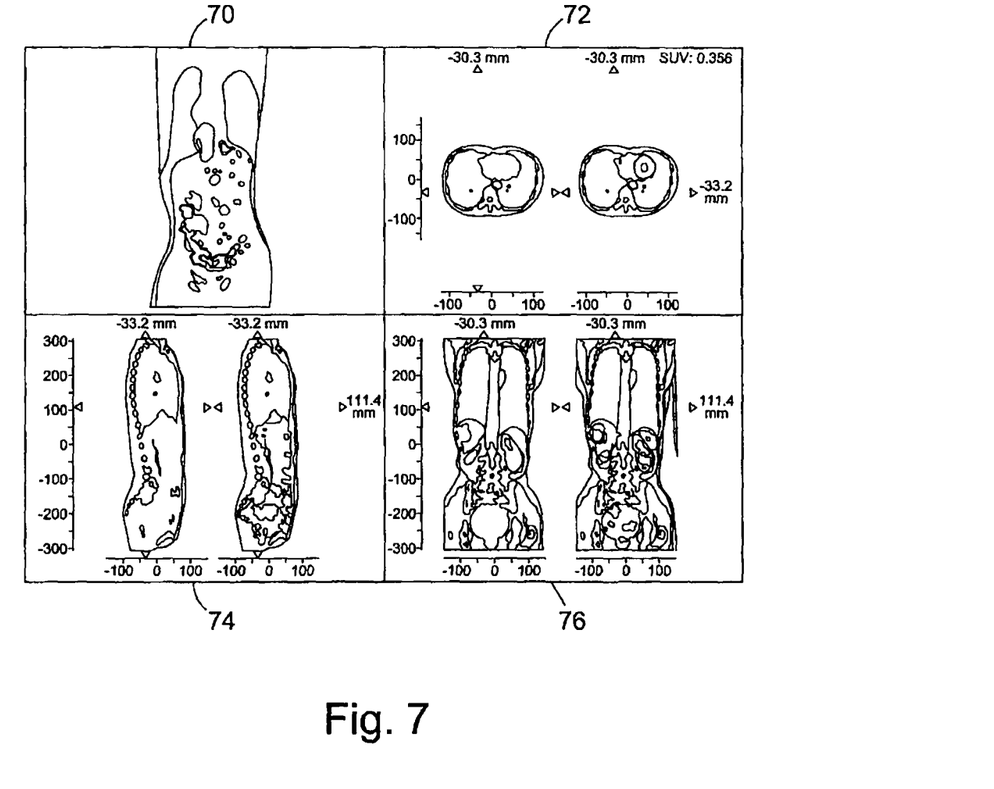
FIG. 7 is a screenshot showing a fused three-dimensional image obtained using different modalities and corresponding two-dimensional images.

In another embodiment, the three dimensional view(s) and/or two dimensional view(s) may represent a fusion of image data obtained using different modalities at the same or different times. In an embodiment illustrated in FIG. 7, a display includes a window 70 displays a three dimensional Volume Rendered fused display of PET volume data and CT volume data acquired from a patient, alongside a window 72 displaying a two dimensional transverse MPR CT image alongside a fused two dimensional image representing transverse MPR of CT data and PET data. A window 74 is also displayed, which displays a two dimensional sagittal MPR of CT image alongside a fused two dimensional image representing sagittal MPR of CT data and PET data. The window 74 is displayed alongside a window 76 displaying a two dimensional coronal MPR of CT image alongside a fused two dimensional image representing coronal MPR of CT data and PET data. The fields of view of each of the three dimensional and two dimensional images of FIG. 7 are linked as already described in relation to other embodiments.

Whilst particular modules have been described herein, in alternative embodiments functionality of one or more of those modules can be provided by a single module or other component, or functionality provided by a single module can be provided by two or more modules or other components in combination.

It will also be well understood by persons of ordinary skill in the art that whilst embodiments implement certain functionality by means of software, that functionality could be implemented solely in hardware (for example by means of one or more ASICs (application specific integrated circuit)) or by a mix of hardware and software. As such, embodiments are not limited only to being implemented in software.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms and modifications as would fall within the scope of the invention.

The invention claimed is:

1. A method of displaying images representative of image data, comprising:
   obtaining a three-dimensional image that comprises a three-dimensional view of a subject's anatomy by processing a three dimensional image data set obtained using a medical imaging modality;
   obtaining at least one two-dimensional image that comprises at least one two-dimensional view of the subject's anatomy by processing the same said three dimensional image data set obtained using said medical imaging modality;
   providing a user interface comprising a display for displaying simultaneously the three-dimensional image that has been obtained by processing said three dimensional image data set obtained using said medical imaging modality and the at least one two-dimensional image that has been obtained by processing the same said three dimensional image data set obtained using said medical imaging modality;
   setting a volumetric field of view for the three-dimensional image;
   setting a respective further field of view for each of the at least one two-dimensional images; and
   linking the volumetric field of view and the at least one further field of view so that a movement of the volumetric field of view of the three-dimensional image automatically causes a corresponding movement of the further field of view or at least one of the further fields of view in the display of the at least one two dimensional image, and so that a movement of the further field of view or at least one of the further fields of view of the at least one two dimensional image automatically causes a corresponding movement of the volumetric field of view in the display of the three dimensional image.

2. A method according to claim 1, wherein the movement comprises a movement in the plane of the display.

3. A method according to claim 1, wherein the movement of one of the volumetric field of view and the at least one further field of view, and the corresponding movement of the other of the volumetric field of view and the at least one further field of view, is subject to at least one constraint.

4. A method according to claim 3, wherein the at least one constraint comprises moving a view point so that it remains inside the volumetric field of view.

5. A method according to claim 3, wherein the method comprises displaying each two-dimensional image in a respective window, and the at least one constraint comprises ensuring that each two-dimensional image is substantially centred in its respective window.

6. A method according to claim 3, wherein the at least one constraint comprises ensuring that the further field of view of the or each two-dimensional image does not extend beyond a volume represented by the data set.

7. A method according to claim 3, wherein the method comprises displaying the three-dimensional image in an image view window, and the at least one constraint comprises ensuring that the three-dimensional image is substantially centred in the image view window.

8. A method according to claim 3, wherein the at least one constraint comprises ensuring that the volumetric field of view does not extend outside a volume represented by the data set.

9. A method according to claim 3, comprising displaying each of the three dimensional image and the or each two dimensional image in a respective window, and the at least one constraint comprises ensuring that, for each image, the boundary of the volume represented by the data set cannot be moved beyond a predetermined location in the window beyond the centre of the window.

10. A method according to claim 3, wherein the at least one constraint comprises ensuring that the position of an intersection point remains within the further field of view of each two-dimensional image.

11. A method according to claim 3, wherein the at least one constraint comprises ensuring that the position of an intersection point remains within the volumetric field of view.

12. A method according to claim 3, wherein the at least one constraint comprises a plurality of constraints and the method comprises applying the constraints in a predetermined order of priority.

13. A method according to claim 1, wherein the method comprises displaying the three-dimensional image in a volumetric image window having a width X and a height Y, the volumetric field of view has three orthogonal dimensions and the setting of the volumetric field of view comprises setting the size of the volumetric field of view in each of the three orthogonal dimensions to be dependent on the width X and/or height Y of the image window.

14. A method according to claim 13, wherein setting the volumetric field of view comprises setting the size of the volumetric field of view to be:
  substantially equal to one of aX or aX-b in the first orthogonal dimension;
  substantially equal to one of aY or aY-c in the second orthogonal dimension; and
  substantially equal to one of aY-d or aX-d in the third orthogonal dimension, where a is a magnification factor, b and c are margins, and d is a clipping distance.

15. A method according to claim 1, wherein the method comprises:
  obtaining a further data set;
  registering the data set and the further data set;
  displaying in registration at least two of: the three dimensional image representative of the data set; a further three dimensional image representative of the further data set; the at least one two dimensional image representative of the data set; at least one further two-dimensional image representative of the further data set; and
  linking the fields of view of each of the displayed images so that lateral movement of the field of view of one of the displayed images causes a corresponding lateral movement of at least one other of the field of view in the display of at least one other of the displayed images.

16. A method according to claim 1, wherein the method comprises automatically causing a pan of one of the three-dimensional image or at least one of the two-dimensional images in response to a pan operation performed on the other of the three-dimensional image or at least one of the two-dimensional images.

17. A method according to claim 1, wherein a rotation operation performed on the three-dimensional image does not automatically cause a variation in the further field of view of the two-dimensional image or any of the further fields of view of the two-dimensional images.

18. A method according to claim 1, wherein said user interface is operable, in response to input of a user, to vary at least one of:
  the volumetric field of view of the three-dimensional image;
  a view point of the three-dimensional image;
  the further field of view of the two-dimensional image or at least one of the further fields of view of the two-dimensional images;
  a view point of the at least one two-dimensional image;
  the intersection of the two dimensional images; and
  an angle of rotation of the three-dimensional image or of at least one of the two-dimensional images.

19. A method according to claim 18, wherein the user interface is operable to perform at least one image operation on the three-dimensional image or the at least one two-dimensional image, said image operation comprising at least one of a pan, zoom or rotate operation.

20. A method according to claim 19, wherein the user interface is configured such that an action can be performed by a user with the user interface on the three dimensional image or on the at least one two dimensional image, and substantially the same type of image operation results from said action regardless of whether the action is directed to the three dimensional image or the at least one two dimensional image.

21. A method according to claim 1, comprising allowing rotation of the three-dimensional image subject to a constraint that rotation of the image around only two orthogonal axes is allowed.

22. A method according to claim 1, wherein the data set is acquired from a subject, and the method comprises displaying the three-dimensional image in a window with the superior-inferior axis of the subject aligned along a first direction within the window, and the method further comprises constraining rotation of the three-dimensional image such that the superior-inferior axis of the subject in the three-dimensional image remains substantially aligned along the first direction despite rotation of the three-dimensional image.

23. A method according to claim 1, wherein the three dimensional image and the at least one two-dimensional image are oriented so that movement of the field of view of the three dimensional image in a direction relative to the user interface causes movement of the field of view of the at least one two dimensional image in substantially the same direction, and vice versa.

24. A method according to claim 1, wherein the method comprises:
  displaying the three dimensional image in a window;
  displaying each of the at least one two dimensional images in a respective further window; and
  displaying the images such that an anatomical feature of the subject appears at substantially the same horizontal and/or vertical position in each of the windows.

25. A method according to claim 1, further comprising:
  setting a view point for the three dimensional image;
  setting a respective further view point for the two dimensional image or each of the two dimensional images;
  linking the view point and the each further view point, so movement of the view point automatically causes movement of the further view point or at least one of the further view points and vice versa, wherein the view point has a fixed relationship with the volumetric field of view substantially at the centre of the field of view;

the each further view point has a fixed relationship with the further field of view or a corresponding one of the further fields of view substantially at the centre of the further field of view or substantially at the centre of the corresponding one of the further fields of view.

26. A method according to claim 25, wherein the linking of the volumetric field of view and the at least one further field of view is obtained by the linking of the view point and the at least one further view point.

27. A method according to claim 25, wherein the view point and the at least one further view point are in a fixed relationship.

28. A method according to claim 25, wherein the at least one two-dimensional image comprises a plurality of two-dimensional images having an intersection point, and the further view point or further view points of the two-dimensional images is different from the intersection point.

29. A method according to claim 28, wherein the intersection point is movable and movement of the intersection point does not automatically vary the volumetric field of view of the three-dimensional image.

30. A method according to claim 1, wherein the at least one two-dimensional image comprises an MPR image, and the three-dimensional image comprises one of a VR or MIP image.

31. A system for displaying images representative of image data, comprising:
- a user interface comprising a display for displaying a three-dimensional image that comprises a three-dimensional view of a subject's anatomy and at least one two-dimensional image that comprises at least one two-dimensional view of said subject's anatomy;
- a processing resource configured to:
  obtain the three-dimensional image by processing a three dimensional image data set obtained using a medical imaging modality;
  obtain the least one two-dimensional image by processing the same said three dimensional image data set obtained using the medical imaging modality;
  set a volumetric field of view for the three-dimensional image;
  set a respective further field of view for the or each of the at least one two-dimensional images;
  link the volumetric field of view and the at least one further field of view so that a movement of the volumetric field of view of the three-dimensional image automatically causes a corresponding movement in the display of the further field of view or at least one of the further fields of view of the at least one two dimensional image, and so that a movement of the further field of view or at least one of the further fields of view of the at least one two dimensional image automatically causes a corresponding movement of the volumetric field of view in the display of the three dimensional image, wherein the linking of the volumetric field of view and the at least one further field of view is performed independently of the subject's anatomy that is included in the three-dimensional image and at least one two-dimensional image, and wherein the user interface comprises the display for displaying the images.

32. A computer program product comprising computer readable instructions that are executable by a computer to:
  obtain a three-dimensional image that comprises a three-dimensional view of a subject's anatomy by processing a three dimensional image data set obtained using a medical imaging modality;
  obtain at least one two-dimensional image that comprises at least one two-dimensional view of the subject's anatomy by processing the same said three dimensional image data set obtained using said medical imaging modality;
  display the three-dimensional image and the at least one two-dimensional image on a user interface comprising a display for displaying the three-dimensional image that has been obtained by processing said three-dimensional image data set obtained using said medical imaging modality and the at least one two-dimensional image that has been obtained by processing the same said three-dimensional image data set obtained using said medical imaging modality;
  set a volumetric field of view for the three-dimensional image;
  set a respective further field of view for the or each of the at least one two-dimensional images;
  link the volumetric field of view and the at least one further field of view so that a movement of the volumetric field of view of the three-dimensional image automatically causes a corresponding movement of the further field of view or at least one of the further fields of view in the display of the at least one two dimensional image, and so that a movement of the further field of view or at least one of the further fields of view of the at least one two dimensional image automatically causes a corresponding movement of the volumetric field of view in the display of the three dimensional image, wherein the linking of the volumetric field of view and the at least one further field of view is performed independently of the subject's anatomy that is included in the three-dimensional image and the at least one two-dimensional image.

* * * * *